United States Patent
Yeh et al.

(10) Patent No.: US 9,576,516 B2
(45) Date of Patent: Feb. 21, 2017

(54) ELECTROPHORETIC DISPLAY APPARATUS HAVING COLORFUL HANDWRITING FUNCTION AND DRIVING METHOD THEREOF

(71) Applicant: E Ink Holdings Inc., Hsinchu (TW)

(72) Inventors: Hsu-Cheng Yeh, Hsinchu (TW); Ming-Chuan Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 101 days.

(21) Appl. No.: 14/568,126

(22) Filed: Dec. 12, 2014

(65) Prior Publication Data

US 2015/0262521 A1 Sep. 17, 2015

(30) Foreign Application Priority Data

Mar. 13, 2014 (TW) .............................. 103109030 A

(51) Int. Cl.
*G09G 3/34* (2006.01)
*G09G 3/16* (2006.01)
(Continued)

(52) U.S. Cl.
CPC ........... *G09G 3/16* (2013.01); *G02F 1/133514* (2013.01); *G02F 1/167* (2013.01);
(Continued)

(58) Field of Classification Search
CPC ........ G06F 3/0412; G06F 3/041; G06F 3/047; G09G 3/38; G09G 3/16; G09G 5/04; G09G 3/344; G02F 1/133514
(Continued)

(56) References Cited

U.S. PATENT DOCUMENTS

2007/0085837 A1* 4/2007 Ricks .................... G06F 3/0412
345/173
2007/0139358 A1* 6/2007 Sakamoto ............ G09G 3/3446
345/107

(Continued)

FOREIGN PATENT DOCUMENTS

| CN | 101893801 A | * 11/2010 | ............. G06F 3/048 |
|---|---|---|---|
| TW | I230833 | 4/2005 | |
| TW | 201039036 | 11/2010 | |
| TW | 201220274 | 5/2012 | |
| TW | 201239721 | 10/2012 | |

OTHER PUBLICATIONS

"Office Action of Taiwan Counterpart Application", issued on Jan. 14, 2016, p. 1-p. 5.

*Primary Examiner* — Adam J Snyder
(74) *Attorney, Agent, or Firm* — Jianq Chyun IP Office

(57) ABSTRACT

An electrophoretic display apparatus includes a substrate, a color filter layer, an electrophoretic display film, a common electrode layer, multiple electrode patterns and multiple spacers. The color filter layer is disposed on the substrate and at least includes multiple first color filter patterns and second color filter patterns. The electrophoretic display film is disposed between the substrate and the color filter layer and includes a flexible substrate and multiple display media. The first and second color filter patterns are respectively corresponding to the display media. The electrode patterns at least include multiple first electrode patterns and second electrode patterns. The first electrode patterns receive a first voltage and are disposed respectively correspondingly to the first color filter patterns, while the second electrode patterns receive a second voltage and are disposed respectively correspondingly to the second color filter patterns. The spacers are disposed between the display media and the substrate.

10 Claims, 3 Drawing Sheets

(51) Int. Cl.
*G02F 1/167* (2006.01)
*G02F 1/1335* (2006.01)
*G06F 3/041* (2006.01)
*G09G 5/04* (2006.01)
*G06F 3/047* (2006.01)
*G06F 3/045* (2006.01)

(52) U.S. Cl.
CPC .............. *G06F 3/041* (2013.01); *G06F 3/047* (2013.01); *G06F 3/0412* (2013.01); *G09G 3/344* (2013.01); *G09G 5/04* (2013.01); *G02F 2001/1676* (2013.01); *G09G 2300/0426* (2013.01); *G09G 2300/0452* (2013.01); *G09G 2320/0242* (2013.01); *G09G 2320/0666* (2013.01); *G09G 2330/10* (2013.01); *G09G 2330/12* (2013.01); *G09G 2340/06* (2013.01)

(58) Field of Classification Search
USPC .................................................. 345/107, 173
See application file for complete search history.

(56) References Cited

U.S. PATENT DOCUMENTS

| | | | |
|---|---|---|---|
| 2007/0171212 A1 | 7/2007 | Sakurai et al. | |
| 2008/0137177 A1* | 6/2008 | Jung | G06F 3/0412 345/173 |
| 2008/0186259 A1* | 8/2008 | Todorokihara | G06F 3/0412 345/76 |
| 2008/0278433 A1* | 11/2008 | Lee | G09G 3/344 345/107 |
| 2010/0007624 A1 | 1/2010 | Jiang et al. | |
| 2011/0090162 A1* | 4/2011 | Shih | G09G 3/344 345/173 |
| 2011/0181532 A1* | 7/2011 | Pan | G06F 3/0412 345/173 |
| 2011/0234513 A1* | 9/2011 | Pan | G06F 3/0412 345/173 |
| 2011/0317252 A1* | 12/2011 | Wang | G02F 1/167 359/296 |
| 2012/0087003 A1 | 4/2012 | Sonoda et al. | |
| 2012/0327020 A1 | 12/2012 | Kohara et al. | |

* cited by examiner

ELECTROPHORETIC DISPLAY APPARATUS HAVING COLORFUL HANDWRITING FUNCTION AND DRIVING METHOD THEREOF

CROSS-REFERENCE TO RELATED APPLICATION

This application claims the priority benefit of Taiwan application serial no. 103109030, filed on Mar. 13, 2014. The entirety of the above-mentioned patent application is hereby incorporated by reference herein and made a part of this specification.

BACKGROUND OF THE INVENTION

Field of the Invention

The invention generally relates to a display apparatus and a driving method thereof, and more particularly, to an electrophoretic display apparatus and a driving method thereof.

Description of Related Art

In the prior art, an electrophoretic display apparatus with touch control function includes a driving array substrate (such as an active device array substrate), an electrophoretic display film adhered onto the driving array substrate and a touch device layer embedded in the electrophoretic display film. The electrophoretic display film has a display medium therein and a plurality of display particles distributed in the display medium. Taking a black-white electrophoretic display apparatus as an example, the display medium is mainly composed of a black electrophoretic liquid and multiple white charged particles blended in the black electrophoretic liquid, where voltages are applied through a driving array substrate to make the white charged particles move so that all the pixels respectively display black color, white color or grayscales. In the prior art, in order to expand the application of the electrophoretic display apparatus, a color filter film is employed and disposed on the electrophoretic display film. At the time, the colorful display effect of the electrophoretic display apparatus is the result that ambient light passes through the color filter film, the white charged particles in the electrophoretic liquid reflect the ambient light and the reflective light penetrate the color filter film so as to present the colorful effect. With such a scheme however, the electrophoretic display apparatus needs a driving array substrate and a touch device layer for the purpose of feedback to produce the touch control function, but the fabrication cost of the driving array substrate is higher so that the fabrication cost of the conventional electrophoretic display apparatus is hard to be reduced.

SUMMARY OF THE INVENTION

Accordingly, the present invention is directed to an electrophoretic display apparatus and a driving method thereof, which have no need to use a driving array substrate but having the colorful handwriting function and low cost advantage.

An electrophoretic display apparatus of the invention includes a substrate, a color filter layer, an electrophoretic display film, a common electrode layer, a plurality of electrode patterns and a plurality of spacers. The color filter layer is disposed on the substrate and at least includes a plurality of first color filter patterns and a plurality of second color filter patterns. The electrophoretic display film is disposed between the substrate and the color filter layer and includes a flexible substrate and a plurality of display media. The first color filter patterns and the second color filter patterns are respectively corresponding to the display media, and the color filter layer and the display media are respectively located at the opposite two sides of the flexible substrate. The common electrode layer is disposed on one of the flexible substrate and the substrate and located between the flexible substrate and the substrate. The electrode patterns are disposed on another one of the flexible substrate and the substrate and located between the flexible substrate and the substrate. The electrode patterns at least include a plurality of first electrode patterns and a plurality of second electrode patterns in which the first electrode patterns are configured to receive a first voltage and disposed respectively correspondingly to the first color filter patterns, while the second electrode patterns are configured to receive a second voltage and disposed respectively correspondingly to the second color filter patterns. The spacers are disposed between the display media of the electrophoretic display film and the substrate.

In an embodiment of the invention, the above-mentioned common electrode layer is disposed on the flexible substrate and located between the flexible substrate and the display media, and the electrode patterns are disposed on the substrate and located between the spacers and the substrate.

In an embodiment of the invention, the above-mentioned common electrode layer is disposed on the substrate and located between the spacers and the substrate, while the electrode patterns are disposed on the flexible substrate and located between the flexible substrate and the display media.

In an embodiment of the invention, each of the display media includes an electrophoretic liquid, a plurality of black charged particles and a plurality of white charged particles, and the black charged particles and the white charged particles are distributed in the electrophoretic liquid.

In an embodiment of the invention, the above-mentioned color filter layer further includes a plurality of third color filter patterns, the electrode patterns further include a plurality of third electrode patterns, and the third electrode patterns are configured to receive a third voltage and are disposed respectively correspondingly to the third color filter patterns.

In an embodiment of the invention, the above-mentioned first color filter patterns, the second color filter patterns and the third color filter patterns are parallel to each other and staggered disposed.

A driving method of an electrophoretic display apparatus of the invention is used for driving the electrophoretic display apparatus and includes: respectively providing the first voltage and the second voltage to the first electrode patterns and the second electrode patterns, in which the difference between the first voltage and the second voltage is equal to the value of the second voltage; using an input tool to contact a region of the electrophoretic display apparatus so that the first color filter pattern corresponding to each of the first electrode patterns in the region displays the color thereof; after using the input tool to contact the region of the electrophoretic display apparatus, respectively providing a fourth voltage and a fifth voltage to the first electrode patterns and the second electrode patterns, in which difference between the fourth voltage and the fifth voltage is equal to the value of the fourth voltage or the fifth voltage; and using the input tool again to contact the region of the electrophoretic display apparatus so that the display medium corresponding to each of the second electrode patterns in the region displays the color thereof.

In an embodiment of the invention, the above-mentioned first voltage is 0 V and the second voltage is −15V.

In an embodiment of the invention, the above-mentioned fourth voltage is 0 V or +15 V, and the fifth voltage is +15V.

In an embodiment of the invention, the above-mentioned input tool is finger or a pillar.

Based on the depiction above, since the electrophoretic display apparatus of the invention has electrode patterns corresponding to color filter patterns with different colors and the electrode patterns can respectively receive different voltages, so that the electrophoretic display apparatus of the invention has no need to use a conventional driving array substrate, which can lower down the fabrication cost of the electrophoretic display apparatus and further makes the electrophoretic display apparatus of the invention have colorful handwriting function.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
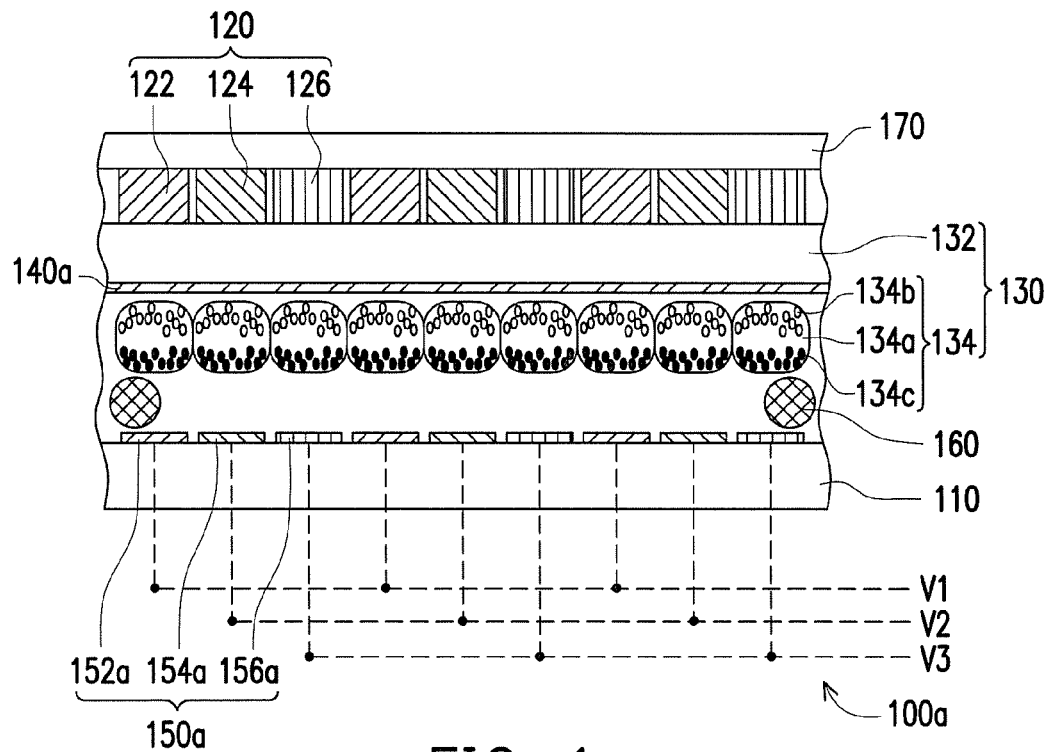
FIG. 1 is a schematic diagram of an electrophoretic display apparatus according to an embodiment of the invention.

FIG. 1 is a schematic diagram of an electrophoretic display apparatus according to an embodiment of the invention. Referring to FIG. 1, in the embodiment, an electrophoretic display apparatus 100a includes a substrate 110, a color filter layer 120, an electrophoretic display film 130, a common electrode layer 140a, a plurality of electrode patterns 150a and a plurality of spacers 160. The color filter layer 120 is disposed on the substrate 110 and at least includes a plurality of first color filter patterns 122 and a plurality of second color filter patterns 124. The electrophoretic display film 130 is disposed between the substrate 110 and the color filter layer 120 and includes a flexible substrate 132 and a plurality of display media 134. The first color filter patterns 122 and the second color filter patterns 124 are respectively corresponding to the display media 134, and the color filter layer 120 and the display media 134 are respectively located at the opposite two sides of the flexible substrate 132. The common electrode layer 140a is disposed on one of the flexible substrate 132 and the substrate 110 and located between the flexible substrate 132 and the substrate 110. The electrode patterns 150a is disposed on another one of the flexible substrate 132 and the substrate 110 and located between the flexible substrate 132 and the substrate 110. The electrode patterns 150a at least include a plurality of first electrode patterns 152a and a plurality of second electrode patterns 154a, wherein the first electrode patterns 152a are configured to receive a first voltage V1 and disposed respectively correspondingly to the first color filter patterns 122, while the second electrode patterns 154a are configured to receive a second voltage V2 and disposed correspondingly to the second color filter patterns 124. The spacers 160 are disposed between the display media 134 of the electrophoretic display film 130 and the substrate 110.

In more details, the substrate 110 of the embodiment is, for example, a resin substrate or a glass substrate. As shown by FIG. 1, the color filter layer 120 further includes a plurality of third color filter patterns 126, in which the first color filter patterns 122, the second color filter patterns 124 and the third color filter patterns 126 are parallel to each other and staggered disposed. The first color filter patterns 122, the second color filter patterns 124 and the third color filter patterns 126 are respectively, for example, red color filter patterns, green color filter patterns and blue color filter patterns, which the invention is not limited to. In other unshown embodiments, the color filter layer can include color filter patterns with two different colors only, or further includes a plurality of fourth color filter patterns, wherein the fourth color filter patterns are, for example, white color filter patterns. The aforementioned technical feature still belongs to the scheme the invention adopts and the scope the invention is to protect. In addition, in order to have better visual effect, the electrophoretic display apparatus 100a of the embodiment further includes a black matrix (not shown) disposed between the first color filter patterns 122, the second color filter patterns 124 and the third color filter patterns 126 for avoiding light-leaking.

Referring to FIG. 1 again, every medium 134 of the electrophoretic display film 130 in the embodiment includes an electrophoretic liquid 134a, a plurality of white charged particles 134b and a plurality of black charged particles 134c, wherein the black charged particles 134c and the white charged particles 134b are distributed in the electrophoretic liquid 134a. In other words, the display media 134 are embodied into capsule electrophoretic display media. In other unshown embodiments, the display media can be micro-cup electrophoretic media, which the invention is not limited to. The common electrode layer 140a in the embodiment is disposed on the flexible substrate 132 and located between the flexible substrate 132 and the display media 134, wherein the material of the common electrode layer 140a is transparent conductive material, and the common electrode layer 140a herein is substantially a whole structure layer, i.e., the common electrode layer 140a entirely overlays the surface of the flexible substrate 132.

The electrode patterns 150a in the embodiment are disposed on the substrate 110 and located between the spacers 160 and the substrate 110, in which the material of the electrode patterns 150a is, for example, silver lines or other conductive items. As shown by FIG. 1, the electrode patterns 150a of the embodiment further include a plurality of third electrode patterns 156a which are configured to receive a third voltage V3 and are respectively corresponding to the third color filter patterns 126. In other unshown embodiments, the electrode patterns can include the electrode patterns receiving two different voltages only or include fourth electrode patterns receiving other voltages only once the color filter patterns with different colors are respectively corresponding to the electrode patterns receiving different voltages, which still belongs to the scheme the invention adopts and the scope the invention is to protect. The electrode patterns 150a herein are separated from each other, and the same first electrode patterns 152a, the same second electrode patterns 154a and the same third electrode patterns 156a respectively receive the first voltage V1, the second voltage V2 and the third voltage V3, and they are staggered disposed. That is, the same electrode patterns are electrically connected to each other in series.

The spacers 160 in the embodiment are embodied to be located between the display media 134 and the electrode patterns 150a for keeping a gap between the display media 134 and the electrode patterns 150a. The material of the spacers 160 is, for example, photoresist or plastic balls. The electrophoretic display apparatus 100a can further include a protective layer 170, which is disposed on the color filter layer 120 for protecting the first color filter patterns 122, the second color filter patterns 124 and the third color filter patterns 126.

The first color filter patterns 122, the second color filter patterns 124 and the third color filter patterns 126 with different colors of the electrophoretic display apparatus 100a in the embodiment are corresponding to the first electrode patterns 152a, the second electrode patterns 154a and the third electrode patterns 156a respectively receiving the first voltage V1, the second voltage V2 and the third voltage V3. Thus, when the first electrode patterns 152a, the second electrode patterns 154a and the third electrode patterns 156a respectively receive the first voltage V1, the second voltage V2 and the third voltage V3 and an input tool (for example, finger, not shown) touches an electrophoretic display apparatus 100g, the white charged particles 134b and the black charged particles 134c in the display media 134 of the touched region are driven to move and produce white, black or colorful display effect. In other words, in comparison with the conventional electrophoretic display apparatus where a driving array substrate and a touch device layer are needed for feedback, the electrophoretic display apparatus 100a of the embodiment does not need to employ the driving array substrate but having the colorful handwriting function and low cost advantage.

Figure 2:
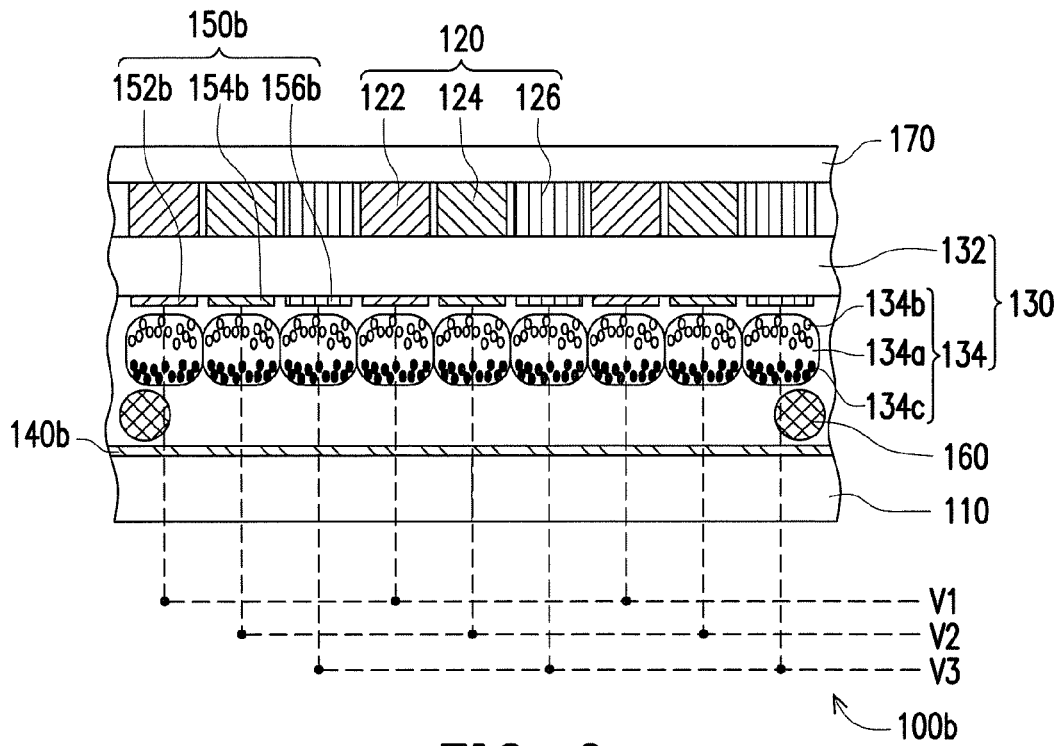
FIG. 2 is a schematic diagram of an electrophoretic display apparatus according to another embodiment of the invention.

FIG. 2 is a schematic diagram of an electrophoretic display apparatus according to another embodiment of the invention. The embodiment uses the device notations and partial content of the aforementioned embodiment, wherever possible, the same reference numbers are used in the drawings and the description to refer to the same or like parts, and the same content is omitted to describe which in fact can refer to the aforementioned embodiment. Referring to FIG. 2, the major difference between an electrophoretic display apparatus 100b of the embodiment and the electrophoretic display apparatus 100a of the aforementioned embodiment rests in that the common electrode layer 140b in the embodiment is disposed on the substrate 110 and located between the spacers 160 and the substrate 110. The electrode patterns 150a are disposed on the flexible substrate 132 and located between the flexible substrate 132 and the display media 134.

In following, the electrophoretic display apparatus 100a in FIG. 1 is as an example, for describing a driving method of an electrophoretic display apparatus through FIGS. 3A-3D.

Figure 3A:
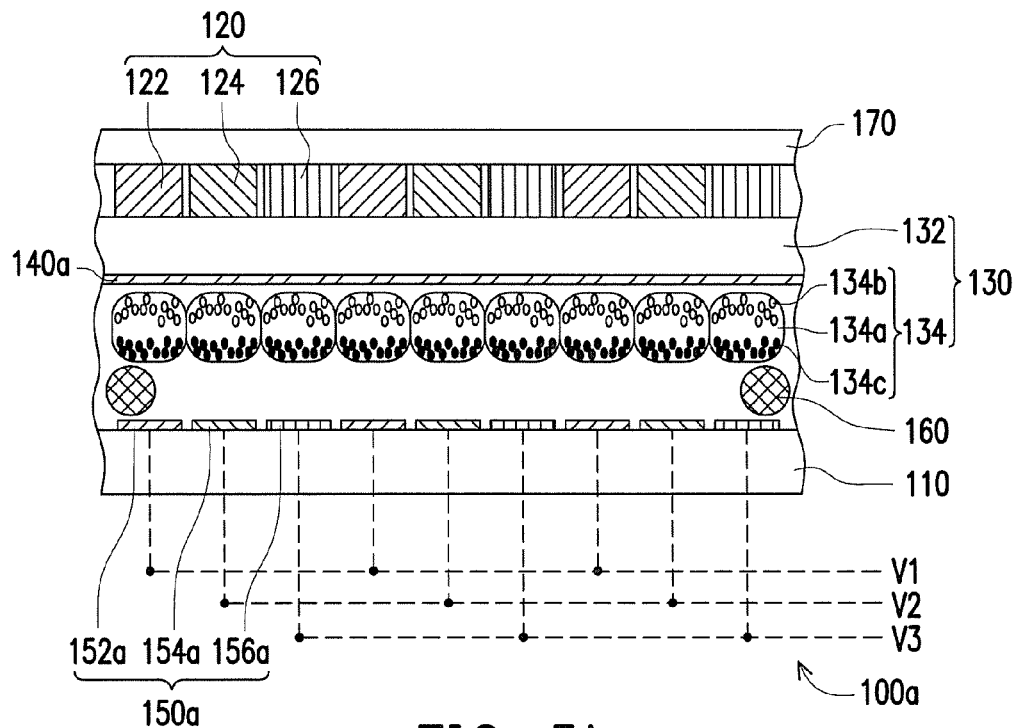
FIGS. 3A-3D are diagrams showing driving an electrophoretic display apparatus according to an embodiment of the invention.

FIGS. 3A-3D are diagrams showing driving an electrophoretic display apparatus according to an embodiment of the invention. Referring to FIG. 3A, in the embodiment, the first voltage V1, the second voltage V2 and the third voltage V3 are provided respectively to the first electrode patterns 152a, the second electrode patterns 154a and the third electrode patterns 156a, wherein the difference between the first voltage V1 and the second voltage V2 is equal to the value of the second voltage V2 and the third voltage V3 is equal to the second voltage V2. The first voltage V1 herein is, for example, 0 V; the second voltage V2 and the third voltage V3 are, for example, −15 V. As shown by FIG. 3, for example, the white charged particles 134b and the black charged particles 134c in all the display media 134 of the embodiment present a white-upper and black-lower pattern, i.e., the electrophoretic display apparatus 100a of the embodiment presents white color, which the invention is not limited to.

Figure 3B:
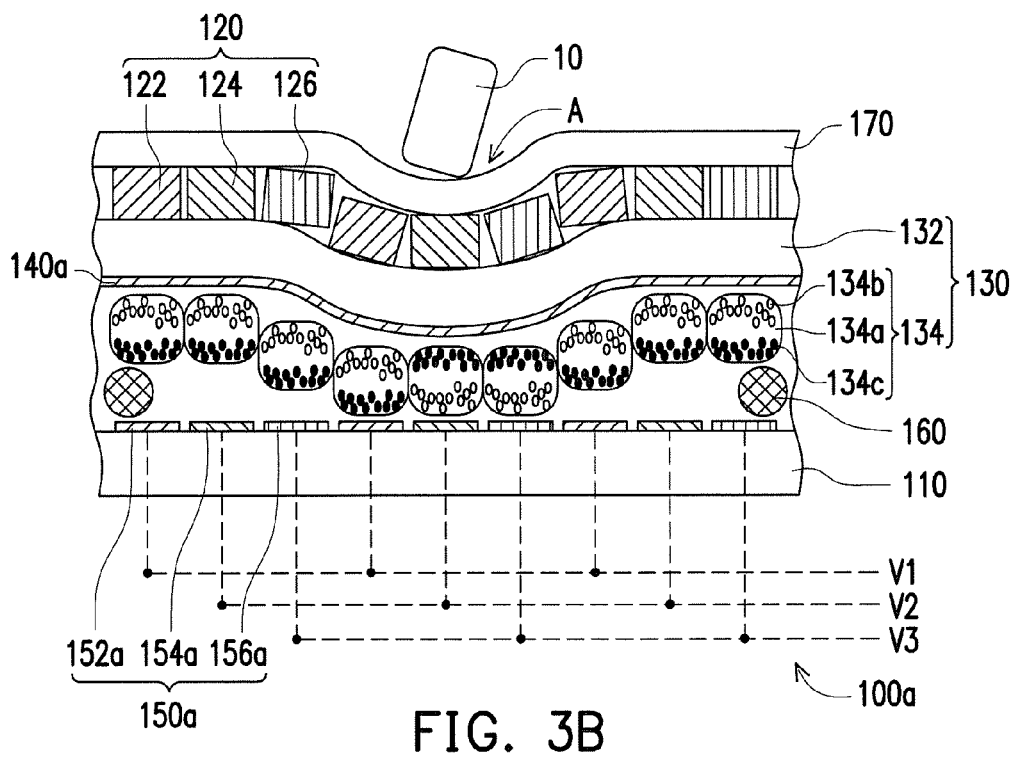

Referring to FIG. 3B, an input tool 10 is used to touch a region A of the electrophoretic display apparatus 100a to display the color of the first color filter patterns 122 corresponding to each of the first electrode patterns 152a in the region A. The input tool 10 herein is, for example, finger or pillar items rather then specific writing pen such as a touch pen. For example, when the input tool 10 touches the region A of the electrophoretic display apparatus 100a, since the first color filter patterns 122 is, for example, red color filter patterns, and the first voltage V1 received by the first electrode patterns 152a corresponding to the first color filter patterns 122 is 0 V, the white charged particles 134b and the black charged particles 134c in the corresponding display media 134 do not present the white-upper and black-lower pattern. At the time, the second electrode patterns 154a and the third electrode patterns 156a corresponding to the second color filter patterns 124 and the third color filter patterns 126 respectively receive the second voltage V2 and the third voltage V3 both having −15 V, so that the white charged particles 134b and the black charged particles 134c in the corresponding display media 134 move to present the black-upper and white-lower pattern from the original white-upper and black-lower pattern. In this way, when the ambient light passes through the color filter layer 120, the white charged particles 134b in the display media 134 corresponding to the first color filter patterns 122 reflect the ambient light to penetrate the first color filter patterns 122 for displaying, that is, the electrophoretic display apparatus 100a displays red color.

Figure 3C:
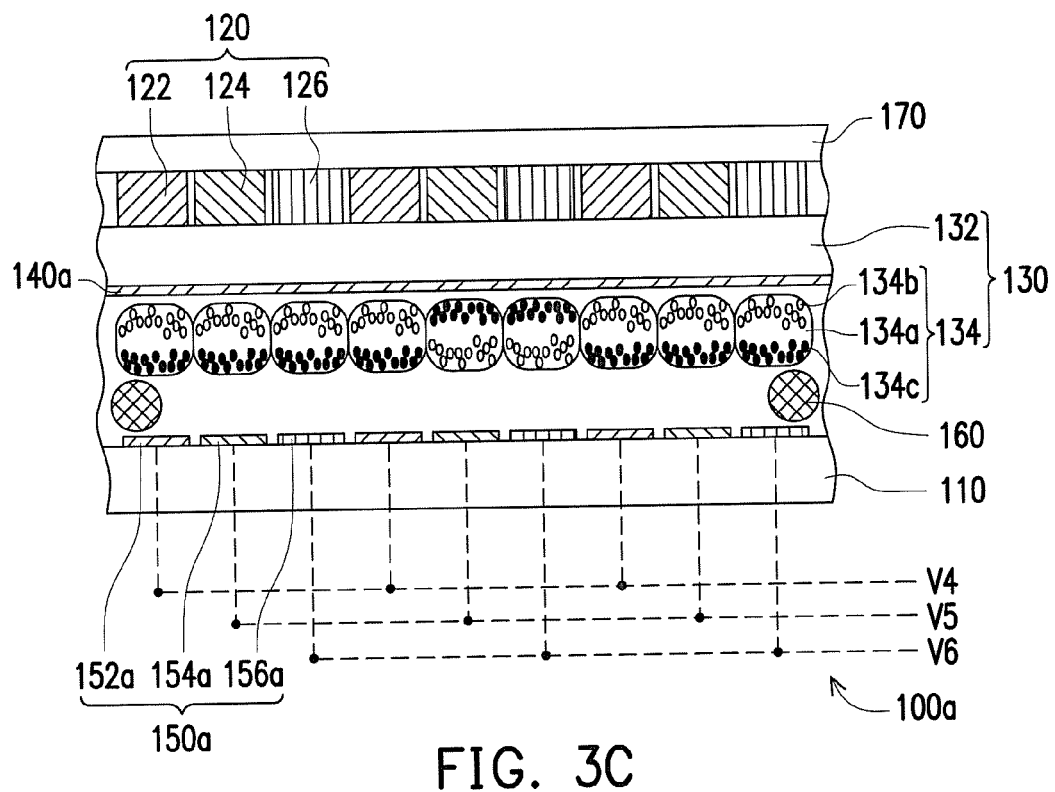

Referring to FIG. 3C, after the input tool 10 touches the region A of the electrophoretic display apparatus 100a, a fourth voltage V4, a fifth voltage V5 and a sixth voltage V6 are provided to the first electrode patterns 152a, the second electrode patterns 154a and the third electrode patterns 156a, wherein the difference between the fourth voltage V4 and the fifth voltage V5 is equal to the value of the fourth voltage V4 or the value of the fifth voltage V5, while the sixth voltage V6 is equal to the fifth voltage V5. The fourth voltage V4 herein is 0 V or +15 V and the fifth voltage V5 and the sixth voltage V6 are +15V. That is, the fifth voltage V5 and the sixth voltage V6 are complementary to the second voltage V2 and the third voltage V3.

Figure 3D:
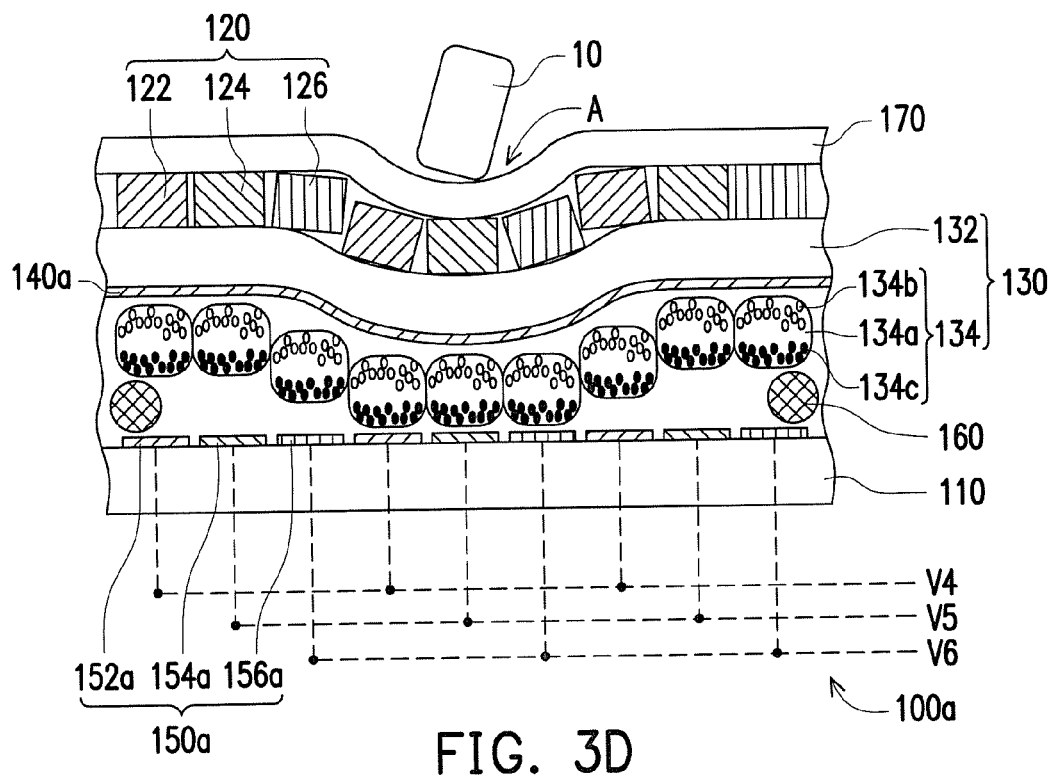

Finally referring to FIG. 3D, when the input tool 10 touch the region A of the electrophoretic display apparatus 100a again, the display media 134 corresponding to each of the second electrode patterns 154a and each of the third electrode patterns 156a in the region A display the colors thereof. That is, when the first electrode patterns 152a, the second electrode patterns 154a and the third electrode patterns 156a respectively receive the fourth voltage V4, the fifth voltage V5 and the sixth voltage V6, the touching electrophoretic display apparatus 100a by the input tool 10, the white charged particles 134b and the black charged particles 134c in the corresponding display media 134 corresponding to the second color filter patterns 124 and the third color filter patterns 126 in the region A would move to present the white-upper and black-lower pattern from the original black-upper and white-lower pattern so that the electrophoretic display apparatus 100a of the embodiment presents white color. In other words, by using the aforementioned driving method, the electrophoretic display apparatus 100a has the function of re-writing without a special writing pen and has considerable convenience.

In summary, since the electrophoretic display apparatus of the invention has electrode patterns corresponding to color filter patterns with different colors and the electrode patterns can respectively receive different voltages, so that the electrophoretic display apparatus of the invention has no need to use a conventional driving array substrate, which can lower down the fabrication cost of the electrophoretic display apparatus and further makes the electrophoretic display apparatus of the invention have colorful handwriting function. In addition, through inputting complementary voltages an electrophoretic display apparatus presenting color state can resume its original black or white state, so that electrophoretic display apparatus of the invention has the function of re-writing without a special writing pen and has considerable convenience.

It will be apparent to those skilled in the art that the descriptions above are several preferred embodiments of the present invention only, which does not limit the implementing range of the present invention. Various modifications and variations can be made to the structure of the present invention without departing from the scope or spirit of the invention. In view of the foregoing, the protective scope of the present invention is given by the following claims and their equivalents.

What is claimed is:

1. An electrophoretic display apparatus, comprising:
   a substrate;
   a color filter layer, disposed on the substrate and at least comprising a plurality of first color filter patterns and a plurality of second color filter patterns;
   an electrophoretic display film, disposed between the substrate and the color filter layer and comprising a flexible substrate and a plurality of display media, wherein the first color filter patterns and the second color filter patterns are respectively corresponding to the display media, and the color filter layer and the display media are respectively located at the opposite two sides of the flexible substrate;
   a common electrode layer, disposed on one of the flexible substrate and the substrate and located between the flexible substrate and the substrate;
   a plurality of electrode patterns, disposed on another one of the flexible substrate and the substrate and located between the flexible substrate and the substrate, the electrode patterns at least comprising a plurality of first electrode patterns and a plurality of second electrode patterns, wherein the first electrode patterns are connected in series, configured to receive a first voltage, and disposed respectively correspondingly to the first color filter patterns, while the second electrode patterns are connected in series, configured to receive a second voltage, and disposed respectively correspondingly to the second color filter patterns; and
   a plurality of spacers, disposed between the display media of the electrophoretic display film and the substrate.

2. The electrophoretic display apparatus as claimed in claim 1, wherein the common electrode layer is disposed on the flexible substrate and located between the flexible substrate and the display media, and the electrode patterns are disposed on the substrate and located between the spacers and the substrate.

3. The electrophoretic display apparatus as claimed in claim 1, wherein the common electrode layer is disposed on the substrate and located between the spacers and the substrate, while the electrode patterns are disposed on the flexible substrate and located between the flexible substrate and the display media.

4. The electrophoretic display apparatus as claimed in claim 1, wherein each of the display media comprises an electrophoretic liquid, a plurality of black charged particles and a plurality of white charged particles, and the black charged particles and the white charged particles are distributed in the electrophoretic liquid.

5. The electrophoretic display apparatus as claimed in claim 1, wherein the color filter layer further comprises a plurality of third color filter patterns, the electrode patterns further comprise a plurality of third electrode patterns, and the third electrode patterns are configured to receive a third voltage and are disposed respectively correspondingly to the third color filter patterns.

6. The electrophoretic display apparatus as claimed in claim 5, wherein the first color filter patterns, the second color filter patterns and the third color filter patterns are parallel to each other and staggered disposed.

7. A driving method of an electrophoretic display apparatus, used for driving the electrophoretic display apparatus as claimed in claim 1 and comprising:
   respectively providing the first voltage and the second voltage to the first electrode patterns and the second electrode patterns, wherein the first electrode patterns are connected in series, the second electrode patterns are connected in series and difference between the first voltage and the second voltage is equal to the value of the second voltage;
   using an input tool to contact a region of the electrophoretic display apparatus so that the first color filter pattern corresponding to each of the first electrode patterns in the region displays the color thereof;
   after using the input tool to contact the region of the electrophoretic display apparatus, respectively providing a fourth voltage and a fifth voltage to the first electrode patterns and the second electrode patterns, wherein difference between the fourth voltage and the fifth voltage is equal to the value of the fourth voltage or the fifth voltage; and
   using the input tool again to contact the region of the electrophoretic display apparatus so that the display medium corresponding to each of the second electrode patterns in the region displays the color thereof.

8. The driving method of the electrophoretic display apparatus as claimed in claim 7, wherein the first voltage is 0 V and the second voltage is −15V.

9. The driving method of the electrophoretic display apparatus as claimed in claim 7, wherein the fourth voltage is 0 V or +15 V, and the fifth voltage is +15V.

10. The driving method of the electrophoretic display apparatus as claimed in claim 7, wherein the input tool is finger or a pillar.

* * * * *